(12) United States Patent
Bell

(10) Patent No.: US 10,189,425 B2
(45) Date of Patent: Jan. 29, 2019

(54) USING DATA COLLECTED BY A PERSONAL ELECTRONIC DEVICE TO IDENTIFY A VEHICLE

(71) Applicant: Agero, Inc., Medford, MA (US)

(72) Inventor: Michael Bell, Salem, MA (US)

(73) Assignee: Agero, Inc., Medford, MA (US)

( * ) Notice: Subject to any disclaimer, the term of this patent is extended or adjusted under 35 U.S.C. 154(b) by 0 days.

(21) Appl. No.: 15/585,013

(22) Filed: May 2, 2017

(65) Prior Publication Data

US 2018/0319354 A1 Nov. 8, 2018

(51) Int. Cl.
*B60R 16/023* (2006.01)

(52) U.S. Cl.
CPC ................. *B60R 16/023* (2013.01)

(58) Field of Classification Search
None
See application file for complete search history.

(56) References Cited

U.S. PATENT DOCUMENTS

| | | | | |
|---|---|---|---|---|
| 4,626,849 A * | 12/1986 | Sims | ........................ | G01S 1/70 180/167 |
| 8,059,489 B1 * | 11/2011 | Lee | ........................ | G01N 29/14 367/136 |
| 8,712,803 B1 * | 4/2014 | Buentello | .............. | G06Q 40/08 705/35 |
| 9,308,902 B1 * | 4/2016 | Noffsinger | .............. | B60T 7/126 |
| 9,576,322 B1 * | 2/2017 | Christensen | .......... | H04W 4/046 |
| 9,616,849 B1 * | 4/2017 | Tucker | .................... | B60R 25/04 |
| 9,700,240 B2 * | 7/2017 | Letchner | ............... | A61B 5/1118 |
| 9,786,154 B1 * | 10/2017 | Potter | .................... | G08B 25/00 |
| 9,817,404 B1 * | 11/2017 | Loo | ........................ | G05D 1/0293 |
| 9,863,392 B1 * | 1/2018 | Tucker | .................... | B60R 25/04 |
| 2003/0233261 A1 * | 12/2003 | Kawahara | .............. | G06Q 10/10 705/4 |
| 2005/0134440 A1 * | 6/2005 | Breed | .................. | B60N 2/2863 340/435 |
| 2005/0256763 A1 * | 11/2005 | Bohonnon | .............. | G06Q 10/08 705/13 |
| 2007/0043496 A1 * | 2/2007 | Ogawa | .................. | B60W 10/06 701/53 |
| 2011/0112969 A1 * | 5/2011 | Zaid | ........................ | G06Q 10/02 705/50 |
| 2011/0159836 A1 * | 6/2011 | Ueoka | .................... | H04H 20/57 455/345 |
| 2011/0175755 A1 * | 7/2011 | Yoshioka | .............. | G01S 3/8083 340/995.1 |
| 2012/0164989 A1 * | 6/2012 | Xiao | ....................... | G07C 5/008 455/414.1 |
| 2013/0165178 A1 * | 6/2013 | Lee | ........................ | H04M 1/00 455/550.1 |
| 2013/0238670 A1 * | 9/2013 | Amirpour | ........... | G01M 17/007 707/812 |
| 2013/0275078 A1 * | 10/2013 | Tanabe | .................. | A63B 24/00 702/141 |

(Continued)

*Primary Examiner* — Curtis J King
(74) *Attorney, Agent, or Firm* — Wolf, Greenfield & Sacks, P.C.

(57) ABSTRACT

Apparatus and methods are disclosed for identifying a vehicle using data collected by a personal electronic device residing in the vehicle during its operation. By enabling the vehicle to be identified using data collected by the personal electronic device, embodiments of the invention may allow other information captured by the personal electronic device relating to the user's operation of the vehicle to be associated with the vehicle.

29 Claims, 9 Drawing Sheets

(56) References Cited

U.S. PATENT DOCUMENTS

| | | | | |
|---|---|---|---|---|
| 2014/0044307 A1* | 2/2014 | Kenagy | ............... | G06K 9/20 |
| | | | | 382/103 |
| 2014/0077972 A1* | 3/2014 | Rathi | ............... | G07C 5/008 |
| | | | | 340/902 |
| 2014/0167973 A1* | 6/2014 | Letchner | ............... | A61B 5/1118 |
| | | | | 340/870.02 |
| 2014/0180615 A1* | 6/2014 | Simon | ............... | B60R 25/24 |
| | | | | 702/65 |
| 2015/0097703 A1* | 4/2015 | Baur | ............... | G08G 1/205 |
| | | | | 340/902 |
| 2015/0112543 A1* | 4/2015 | Binion | ............... | G07C 5/085 |
| | | | | 701/32.2 |
| 2015/0112733 A1* | 4/2015 | Baker | ............... | G06Q 40/08 |
| | | | | 705/4 |
| 2015/0154711 A1* | 6/2015 | Christopulos | ............... | G06Q 40/08 |
| | | | | 705/7.29 |
| 2015/0304370 A1* | 10/2015 | Maytal | ............... | H04L 12/1822 |
| | | | | 370/260 |
| 2015/0324924 A1* | 11/2015 | Wilson | ............... | G06Q 40/08 |
| | | | | 705/4 |
| 2015/0371541 A1* | 12/2015 | Korman | ............... | G08G 1/144 |
| | | | | 340/932.2 |
| 2016/0071334 A1* | 3/2016 | Johnson | ............... | G07C 5/0808 |
| | | | | 701/29.1 |
| 2016/0098864 A1* | 4/2016 | Nawrocki | ............... | H04B 5/0025 |
| | | | | 705/13 |
| 2016/0101319 A1* | 4/2016 | Tanabe | ............... | A61B 5/1118 |
| | | | | 434/255 |
| 2016/0163029 A1* | 6/2016 | Gibbon | ............... | G06K 9/00221 |
| | | | | 382/190 |
| 2017/0109828 A1* | 4/2017 | Pierce | ............... | G06Q 40/08 |
| 2017/0134885 A1* | 5/2017 | Lortz | ............... | H04W 4/008 |
| 2017/0161820 A1* | 6/2017 | Friedman | ............... | G06Q 20/322 |
| 2017/0265783 A1* | 9/2017 | Letchner | ............... | A61B 5/1118 |

* cited by examiner

USING DATA COLLECTED BY A PERSONAL ELECTRONIC DEVICE TO IDENTIFY A VEHICLE

BACKGROUND

Conventionally, direct measurements of the behavior of a vehicle operator during vehicle operation are made using dedicated components (i.e., by components which are designed to be permanently associated with the vehicle). For example, some conventional hardware components are embedded within a vehicle (e.g., during manufacture) and other, so-called "aftermarket" components are designed for permanent installation within a vehicle.

SUMMARY

The Assignee has appreciated that using a personal electronic device (e.g., a smartphone, tablet, wearable device, gaming console, and/or any other suitable electronic device(s) associated with a user) to collect data relating to the behavior of a vehicle operator during operation may reduce the cost of collecting such data, since it would reduce or eliminate the need for dedicated hardware to do so. The Assignee has also appreciated, however, that one issue relating to using a personal electronic device to collect such data is that the data is attributable to the user of the personal electronic device, rather than to any particular vehicle operated by the user, and that the user may travel in any number of different vehicles over time. Some embodiments of the invention, then, are directed to identifying a vehicle in which a user travels using data collected by a personal electronic device. Identifying the vehicle using data collected by a personal electronic device may allow other information captured by the personal electronic device which relates to the user's operation of the vehicle to be associated with the vehicle. As a result, costly dedicated hardware need not be used to collect direct measurements of the user's behavior during vehicle operation.

The Assignee has further appreciated that being able to identify a vehicle using data collected by a personal electronic device may enable insurers to offer usage-based insurance (UBI) at lower cost than if costly dedicated hardware were used. Specifically, an insurer may tailor the underwriting of a UBI policy to a specific vehicle based on direct measurements of an individual's behavior in operating the vehicle, without needing to employ costly hardware to collect such measurements. However, it should be appreciated that the invention is not limited to being used to collect data for underwriting a UBI policy, as the ability to identify a vehicle using data collected by a personal electronic device may have any of numerous other uses.

In some embodiments, the accelerometer, gyroscope and/or global positioning system (GPS) components of a personal electronic device may provide information that is useful for identifying a vehicle. For example, in some embodiments of the invention, readings produced by the accelerometer of the personal electronic device may be sampled at some (e.g., predefined) frequency during vehicle operation, and patterns present within these readings may be used to identify the vehicle. In some embodiments, the readings may indicate acceleration in the x-, y- and z-directions (or in any other suitable direction(s), as defined in any suitable manner) in the time domain, and the readings may be decomposed into components represented in the frequency domain. In this respect, the Assignee has appreciated that the vibration patterns expressed by a vehicle over a range of frequencies may uniquely identify the vehicle. As a result, acceleration data captured by a user's personal electronic device while traveling in a vehicle may be processed to identify the vehicle.

In some embodiments, the acceleration data which is used to identify a vehicle is captured while the vehicle operates in a known, predetermined manner. As one example, the Assignee has appreciated that (for reasons described in further detail below) the computational expense associated with identifying a vehicle based upon its vibration patterns may be lowest when the vehicle is idling. As a result, in some embodiments, the GPS unit of a personal electronic device may be used to identify periods when the location of the personal electronic device, and thus the vehicle, is unchanged (as this may indicate when the vehicle is idling), and accelerometer readings captured during these periods may be analyzed to identify the vehicle.

In some embodiments, one or more mathematical models and/or other algorithms may be used to process readings from a personal electronic device and/or transformed representations thereof to identify a vehicle. For example, one or more mathematical models may be used to identify the characteristics of a vehicle's vibration patterns which allow the vehicle to be distinguished from other vehicles. The model(s) may, for example, be initially trained using data gathered from any suitable number of vehicles, over any suitable period of time, and may be updated over time as more and more data (e.g., on more and more vehicles over time) is gathered and processed. As a result, the accuracy with which the model(s) identify a vehicle may increase over time.

A vehicle may be identified using its vibration patterns at any suitable juncture(s) and by any suitable component(s). For example, in some embodiments, readings collected from the components of a personal electronic device traveling in a vehicle may be processed by one or more modules executed by a server which is physically remote from the personal electronic device, at some time after the readings are captured. By contrast, in some embodiments these readings may be processed in real-time by the personal electronic device itself as data is captured, such as to provide real-time feedback to the user of the device and/or to enable functionality associated with a particular vehicle or type of vehicle provided by the device. Any of numerous different modes of implementation may be employed.

Some embodiments of the invention are directed to a method, comprising acts of: (A) receiving data captured by a personal electronic device residing within a vehicle during operation of the vehicle; and (B) identifying the vehicle based at least in part on the data.

Other embodiments of the invention are directed to least one computer-readable storage medium having instructions recorded thereon which, when executed by a computer, cause the computer to perform a method comprising acts of: (A) receiving data captured by a personal electronic device residing within a vehicle during operation of the vehicle; and (B) identifying the vehicle based at least in part on the data.

Still other embodiments of the invention are directed to a computing system, comprising: at least one computer-readable storage device, storing instructions; and at least one computer processor, programmed via the instructions to: receive data captured by a personal electronic device residing within a vehicle during operation of the vehicle; and identify the vehicle based at least in part on the data.

The foregoing is a non-limiting summary of certain aspects of the invention. Some embodiments of the invention are described in further detail in the sections that follow.

BRIEF DESCRIPTION OF DRAWINGS

Various aspects and embodiments of the invention are described below with reference to the following figures. It should be appreciated that the figures are not necessarily drawn to scale. Items appearing in multiple figures are indicated by like reference numerals in each figure in which the items appear.

DETAILED DESCRIPTION

Figure 1:
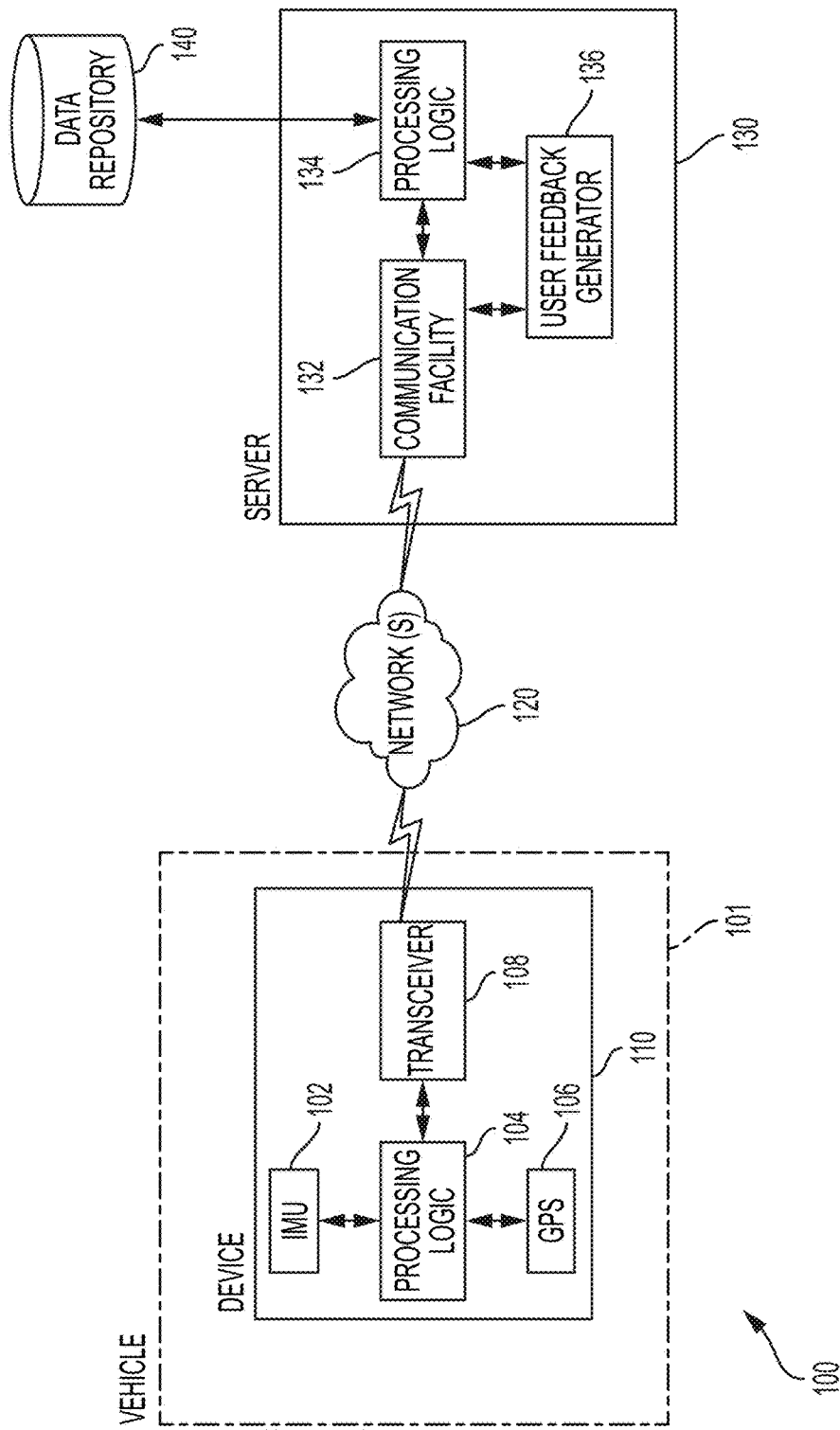
FIG. 1 is a block diagram depicting a representative system for identifying a vehicle based on information captured using a personal electronic device, in accordance with some embodiments of the invention.

Some embodiments of the invention are directed to identifying a vehicle using data collected by a personal electronic device. By enabling the vehicle to be identified using data collected by the personal electronic device, some embodiments of the invention may allow other information captured by the personal electronic device relating to the user's operation of the vehicle to be associated with the vehicle, so that costly hardware which is permanently associated with the vehicle is not required.

It should be appreciated that, as used herein, the phrase "identifying a vehicle" need not necessarily mean uniquely identifying a particular vehicle, such as by distinguishing one 2007 Toyota Corolla from another 2007 Toyota Corolla (although some embodiments of the invention may enable vehicle identification at such a granular level). Rather, in some embodiments, "identifying a vehicle" may mean identifying the year, make, model, class and/or type of the vehicle, or some subset of these vehicle characteristics, and in some embodiments, identifying a vehicle may mean distinguishing between one of a set of vehicles and another of the set without determining any of the aforementioned vehicle characteristics. For example, identifying a vehicle may mean being able to discriminate between a Toyota Corolla and a BMW M3, between a 2010 BMW M3 and a 2012 BMW M3, between a BMW M3 and a BMW 325i, between a sedan and a sport utility vehicle, and/or between an eighteen-wheeler truck and a vehicle which is not an eighteen-wheeler truck. It may also, or alternatively, mean being able to discriminate one year, make, model, class and/or type of vehicle from all others, such as being able to determine whether a vehicle is a 2007 Toyota Corolla or not. It may also, or alternatively, mean being able to discriminate between one of a set of vehicles in which a user is known to travel (e.g., one vehicle that the user has insured) and another of the set (e.g., another vehicle that he/she has insured). Identification of a vehicle may take any of numerous forms, and the invention is not limited to identifying a vehicle in any particular way.

In some embodiments, the accelerometer, gyroscope and/or GPS components of a personal electronic device may provide information that is usable to identify a vehicle. For example, in some embodiments, accelerometer readings indicating acceleration of the personal electronic device in one or more directions (e.g., in x-, y- and z-directions, and/or in any other suitable direction(s), as defined in any suitable way(s)) over time may be sampled while the personal electronic device resides in the vehicle during its operation, and these readings may be transformed (e.g., via a Fourier transform, and/or any other suitable technique(s)) to produce representations in the frequency domain. These representations may reveal oscillations within or across one or more frequency ranges, akin to a vibrational "signature" that may be useful in identifying the vehicle. Gyroscope and/or GPS readings may, for example, be used to determine when the vehicle and/or personal electronic device are being operated in predefined ways which the Assignee has recognized yield readings which are most useful in identifying the vehicle. For example, gyroscope and/or other instrument readings may be used to identify periods during which the personal electronic device is in (and/or is not in) one of a set of predetermined orientations and/or modes of use. For example, the Assignee has appreciated that accelerometer readings taken while the personal electronic device is in active use may not be as useful in identifying the vehicle, and so accelerometer readings taken during periods of active use (e.g., as indicated by readings from a gyroscope and/or other instruments) may be ignored. As another example, GPS readings may be used to identify periods when the location (e.g., geolocation) of the personal electronic device, and thus the vehicle, is unchanged (i.e., the vehicle is idling), as the Assignee has appreciated that the computational expense associated with identifying a vehicle based upon acceleration data is lowest when the vehicle is idling.

FIG. 1 depicts a representative system 100 for collecting and processing data from a personal electronic device to identify a vehicle in which the device travels. In representative system 100, personal electronic device 110 travels within vehicle 101, but is not permanently associated with vehicle 101, or any other particular vehicle, and may be transported by a user from one vehicle to another. As such, vehicle 101 is represented using dotted lines in FIG. 1. Although a label in the singular person is used herein to reference a personal electronic device, it should be appreciated that the components used to collect data useful for identifying a vehicle may be physically and/or logically distributed across any suitable number of hardware devices, each adapted for transport by a user between settings (e.g., vehicles) as the user desires.

Vehicle 101 may be any suitable vehicle, adapted for travel on land, sea and/or air. For example, vehicle 101 may be an automobile, truck, motorcycle, boat, helicopter, airplane, and/or any other suitable type of vehicle.

In representative system 100, personal electronic device 110 comprises inertial measurement unit (IMU) 102, processing logic 104, GPS unit 106, and transceiver 108. IMU 102 may comprise any suitable collection of components for capturing the movement and/or orientation of personal electronic device 110. For example, in some embodiments, IMU 102 may comprise one or more accelerometers, gyroscopes, magnetometers, and/or any other suitable components. IMU 102 provides data to processing logic 104 for processing. This processing may take any of numerous forms, and some representative processing modes are described in further detail below. For example, in some embodiments, processing logic 104 may comprise software code that is executed to apply one or more mathematical models to readings captured by IMU 102 so as to identify a vehicle. GPS unit 106 captures information relating to the location of personal electronic device 110 over time, which may be used to infer the speed at which personal electronic device 110 (and thus the vehicle in which it travels) is moving at any given time. It should be appreciated, however, that vehicle location and/or speed may be measured in any of numerous ways, and that embodiments of the invention are not limited to using a GPS unit to measure device location and/or speed. Any suitable technique(s) and/or component(s) may be employed.

Personal electronic device 110 further includes transceiver 108 which allows personal electronic device 110 to communicate via network(s) 120 with server 130. Network(s) 120 may comprise any suitable communications infrastructure, and employ any suitable communication protocol(s), as the invention is not limited in this respect. For example, if personal electronic device 110 comprises a smartphone adapted for cellular communication, then network(s) 120 may comprise one or more cellular networks.

Server 130 comprises communication facility 132 for receiving transmissions from, and sending transmissions to, personal electronic device 110 via network(s) 120. Communication facility 132 may take any of numerous forms, which may be driven by the communications infrastructure comprising network(s) 120. For example, if network(s) 120 comprise one or more wired networks, then communication facility 132 may comprise a network adapter useful for receiving transmissions over the wired network(s), and if network(s) 120 comprise one or more wireless networks, then communication facility 132 may comprise a radio useful for receiving transmissions over the wireless network(s). Of course, communication facility may comprise components useful for receiving transmissions over different types of networks.

Server 130 includes processing logic 134. In some embodiments, processing logic 134 may comprise software code that is executable to process information received from personal electronic device 110 via network(s) 120. As an example, processing logic 134 may be used to process acceleration data (and/or representations thereof) received from personal electronic device 110 to identify a vehicle in which personal electronic device 110 has traveled. Processing logic 134 stores information in, and retrieves information from, data repository 140. For example, processing logic 134 may cause acceleration data and/or representations thereof received from personal electronic device 110 to be stored in data repository 140. Results generated by processing the data received from personal electronic device 110 may be stored in data repository 140. Although only one data repository 140 is shown in FIG. 1, it should be appreciated that any suitable number of data repositories may be employed.

Results generated by processing logic 134 may be provided to user feedback generator 136. In some embodiments, user feedback generator 136 may comprise software code which is executable to generate information for presentation to a user (e.g., to a user of personal electronic device 110, such as to provide real-time feedback, or to one or more other users not represented in FIG. 1, as described in further detail below). If the information generated by user feedback generator 136 is to be provided to a user of electronic device 110, it may be transmitted to personal electronic device 110 via communication facility 132 and network(s) 120.

It should be appreciated that although the description above includes references to several components of representative system 100 being implemented at least in part via software, any of the components of representative system 100 may be implemented using any suitable combination of hardware and/or software components. As such, each component should be generically considered a controller which may employ any suitable collection of hardware and/or software components to perform the described function.

It should also be appreciated that although only a single server 130 and single personal electronic device 110 is shown in FIG. 1, any suitable number of server components may be used to process information received from any suitable number of personal electronic devices. Any information gathered by a personal electronic device may be processed by components which are logically and/or physically distributed across any suitable number of server devices. In similar fashion, any processing of such information may be logically and/or physically distributed across processing logic 104 on a personal electronic device 110 and processing logic 134 on a server 130, in any suitable fashion. Any of numerous different modes of implementation may be employed.

Figure 2:
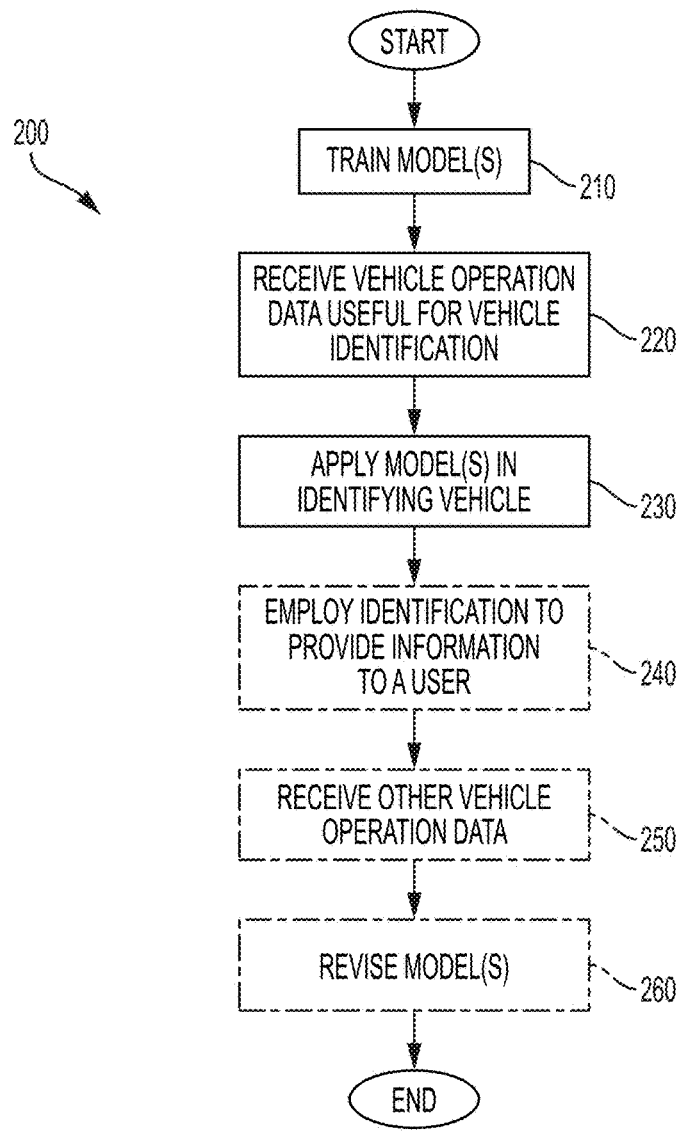
FIG. 2 is a flow chart depicting a representative process for identifying a vehicle using information captured using a personal electronic device, in accordance with some embodiments of the invention.

FIG. 2 depicts a representative high-level process 200 for identifying a vehicle based upon data which is captured by a personal electronic device 110. In summary, representative process 200 involves training one or more models to identify a vehicle using data captured by a personal electronic device in the act 210, subsequently receiving vehicle operation data in the act 220, and applying the model(s) developed in the act 210 to identify the vehicle in the act 230. In some embodiments, representative process 200 may optionally (as indicated by the dotted lines in FIG. 2) include employing the vehicle identification to supply vehicle-specific information to a user in the act 240, receiving other vehicle operation data in the act 250, and/or revising the model(s) trained in the act 210 based upon vehicle operation data collected in the act 250. The acts comprising representative process 200 are described in further detail in the paragraphs that follow.

Figure 3:
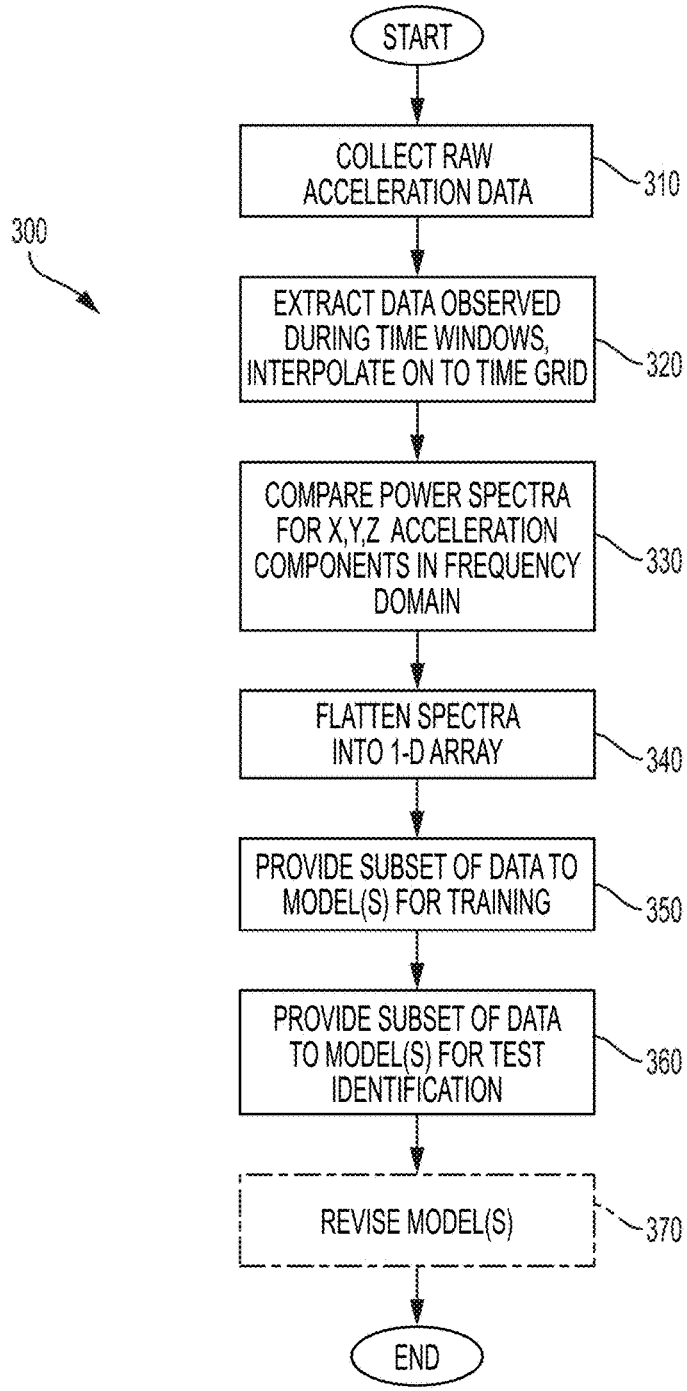
FIG. 3 is a flow chart depicting a representative process for capturing and processing acceleration data captured by a personal electronic device to identify a vehicle, in accordance with some embodiments of the invention.

At the start of representative process 200, one or more mathematical models are trained to identify a vehicle based upon data captured by one or more personal electronic devices traveling in the vehicle in the act 210. A representative process 300 for training one or more models to identify a vehicle using data captured by one or more personal electronic devices is shown in more detail in FIG. 3.

Representative process 300 starts in act 310, wherein acceleration data is collected by one or more personal electronic devices while each device travels in one or more vehicles. For example, an accelerometer component of each personal electronic device may capture acceleration components in three dimensions, referred to herein as x-, y- and z-directions for simplicity. Of course, acceleration may be characterized as occurring in any suitable direction(s), which may or may not correspond to x-, y- and/or z-directions in a Cartesian coordinate system. The invention is not limited in this respect.

In some embodiments, for purposes of training the model(s), the acceleration data collected in the act 310 may be specifically associated with a particular vehicle, set of vehicles, and/or vehicle(s) exhibiting certain qualities. For example, one acceleration data set captured by a personal electronic device in vehicle A may be labeled as relating to vehicle A, another acceleration data set captured in vehicle B may be labeled as relating to vehicle B, and/or another acceleration data set captured in vehicle C may be labeled as relating to vehicles having one or more qualities exhibited by vehicle C, As noted above, in some embodiments, acceleration data may be captured by each personal electronic device while it is in a vehicle exhibiting one or more predetermined characteristics or conditions. For example, in some embodiments, acceleration data is captured by each personal electronic device as it is in a vehicle in operation (e.g., its engine is running) but not moving—i.e., while it is idling. In this respect, the Assignee has recognized that capturing acceleration data while a vehicle is idling may offer several advantages over capturing such data while the vehicle is in motion. One advantage flows from the Assignee's observation that the vibration patterns exhibited by a moving vehicle commonly vary based upon operating conditions such as weather, road conditions, the vehicle's speed, etc., while vibration patterns exhibited by an idling vehicle are relatively consistent. The Assignee further recognized that because any mathematical model(s) used to identify a vehicle using acceleration data would have to compensate for the variances caused by operating conditions (i.e., by performing additional computations), it is computationally less expensive to identify a vehicle using acceleration data captured while the vehicle is idling than using data captured while the vehicle is in motion.

Another advantage flows from the ability to use a wide range of conventional personal electronic devices to capture acceleration data. In this respect, the Assignee has observed that many personal electronic devices have the ability to sample acceleration data at a maximum frequency of 100 Hz (i.e. every 10 milliseconds). The Assignee has also recognized that, due to known phenomena, sampling acceleration data at 100 Hz provides the ability to reliably measure vibration patterns at frequencies up to 50 Hz. The Assignee has further recognized that many vehicles produce vibrations in frequency ranges between 10 Hz and 30 Hz while idling, but that vehicles commonly produce vibrations at frequencies greater than 50 Hz when moving. Thus, identifying a vehicle using acceleration data captured while a vehicle is idling enables a wide range of conventional personal electronic devices to be used to capture the data.

An additional advantage flows from the ability to sample at a relatively low frequency (e.g., at 100 Hz). Specifically, sampling less frequently produces less data to be processed in identifying the vehicle, thereby reducing the computational expense of doing so.

It should be appreciated, however, that the invention is not limited to capturing acceleration data captured while a vehicle is idling, or to analyzing acceleration data within any specific range of frequencies to identify a vehicle. Any suitable technique(s) may be employed, and the technique(s) may vary over time. For example, over time, if personal electronic devices become capable of sampling acceleration data at frequencies which exceed 100 Hz, and/or the computational expense associated with identifying a vehicle using acceleration data captured while the vehicle is in motion becomes less of a concern, then a vehicle may be identified using data captured while the vehicle is moving.

Referring again to FIG. 3, at the completion of act 310, representative process 300 proceeds to act 320, wherein acceleration data observed during one or more specific time windows is extracted. Extraction of data observed during one or more windows may be performed in any suitable way. For example, in some embodiments, a subset of the acceleration readings taken in the act 310 may be discarded, such as to account for initial setup and/or tear-down of the personal electronic device in the vehicle. In some embodiments, any non-discarded data may be divided into information captured during five second windows, with a 2.5 second overlap between windows. In this respect, the Assignee has recognized that the longer the sampling window, the greater the resolution of the resulting representation of the sampled data in the frequency domain, which should enable easier identification of vibrational patterns which distinguish one vehicle from another. The Assignee has also observed that sampling windows shorter than five seconds commonly produce representations in the frequency domain in which such distinguishing features may be harder to identify, and that sampling windows longer than five seconds commonly produce representations having resolutions not appreciably greater than those produced from data in five second sampling windows. Of course, any suitable sampling window and/or overlap between windows may be used. Moreover, the sampling window and overlap between windows may be fixed or variable. The invention is not limited in this respect.

Figure 6A:
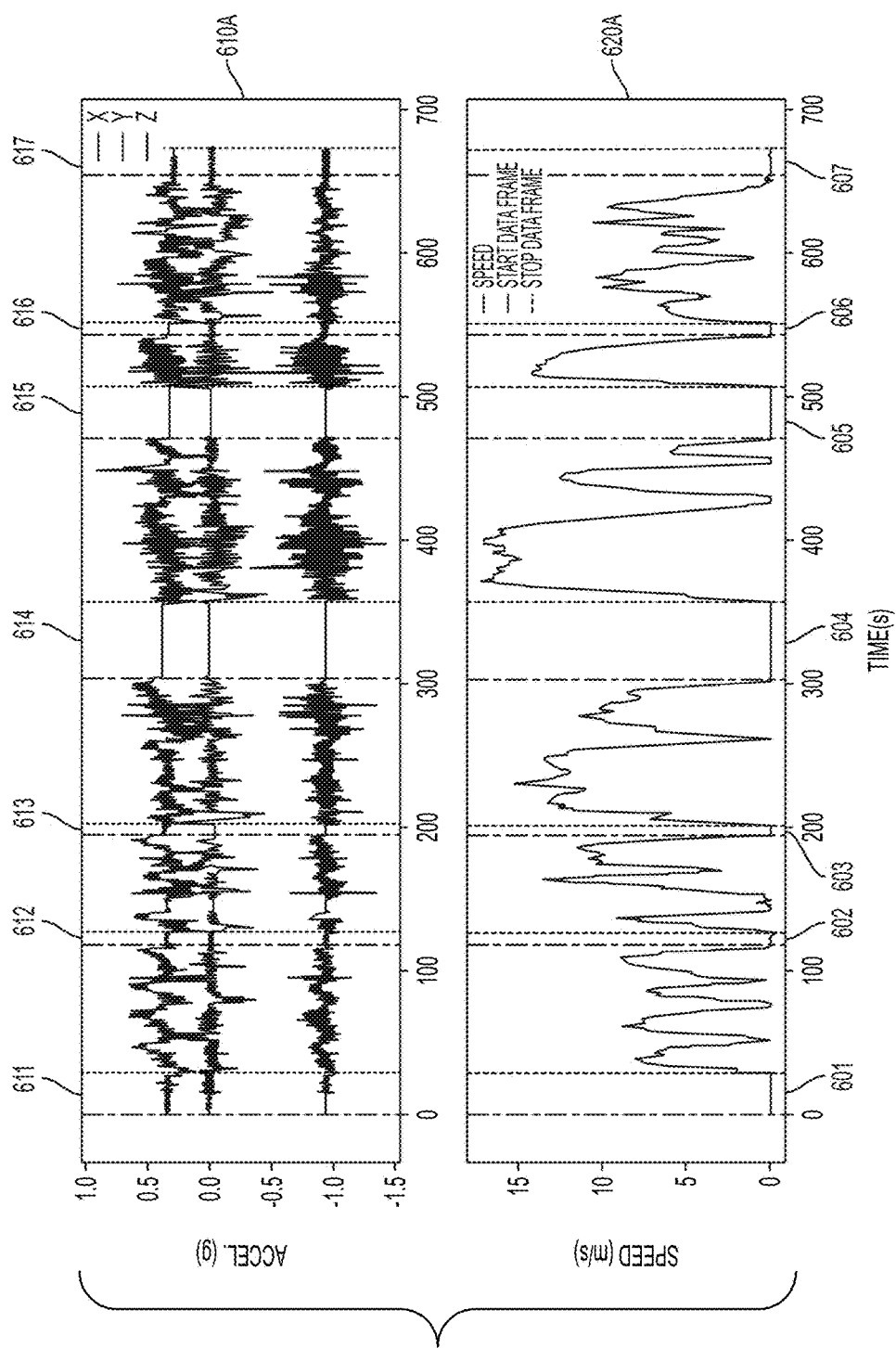
FIGS. 6A-6B depict representations of acceleration data captured during trips in two different vehicles, in accordance with some embodiments of the invention.
Figure 6B:
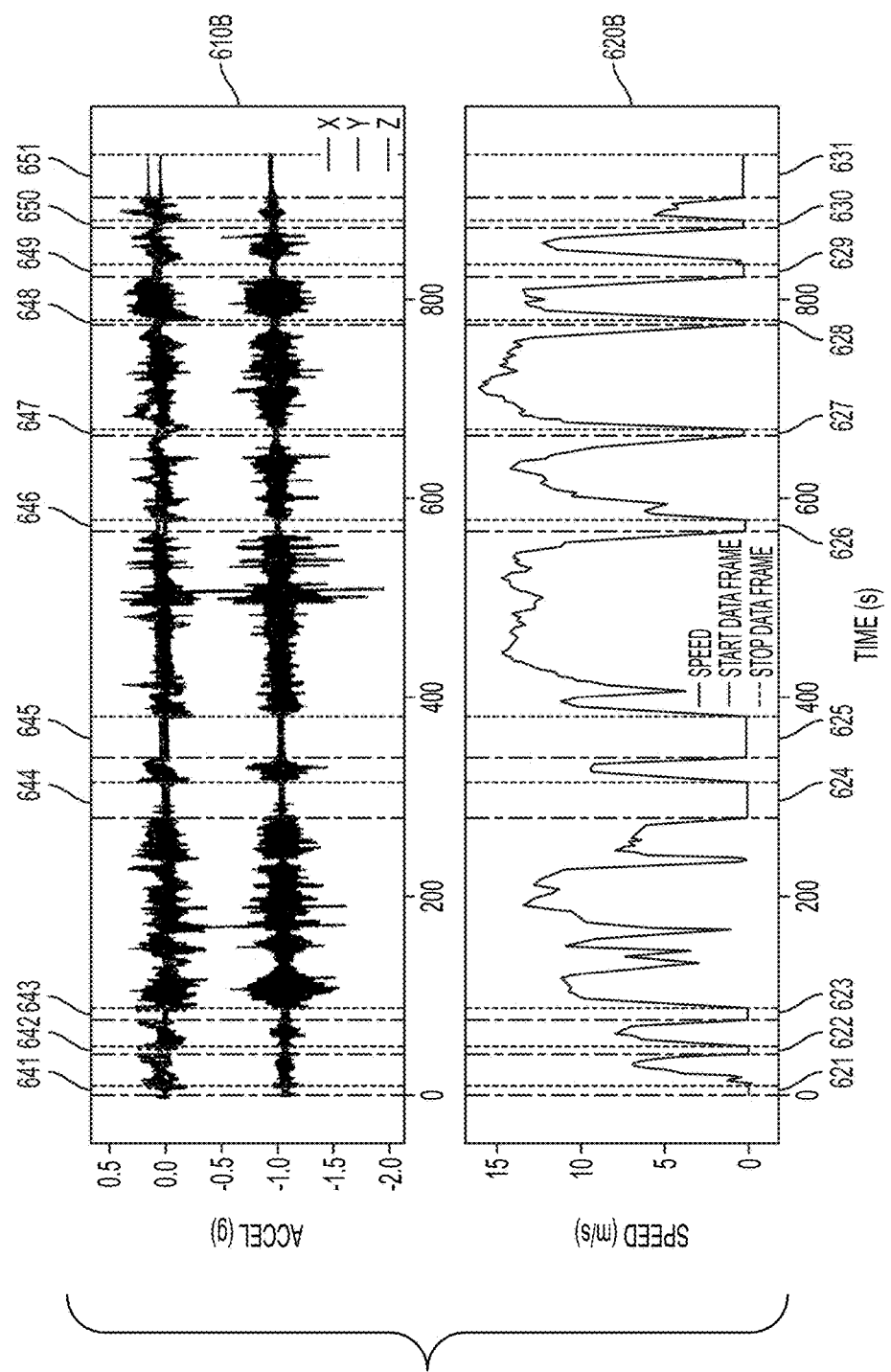

In representative process 300, act 320 also involves interpolating data in each sampling window on to a regularly sampled time grid. This may be accomplished in any suitable fashion, such as via linear interpolation. The result of the act 320 is data describing acceleration in the x, y and z directions, captured in the time domain, such as is shown in the graphs shown at the top of each of FIGS. 6A and 6B. These graphs are described in further detail below.

Figure 4:
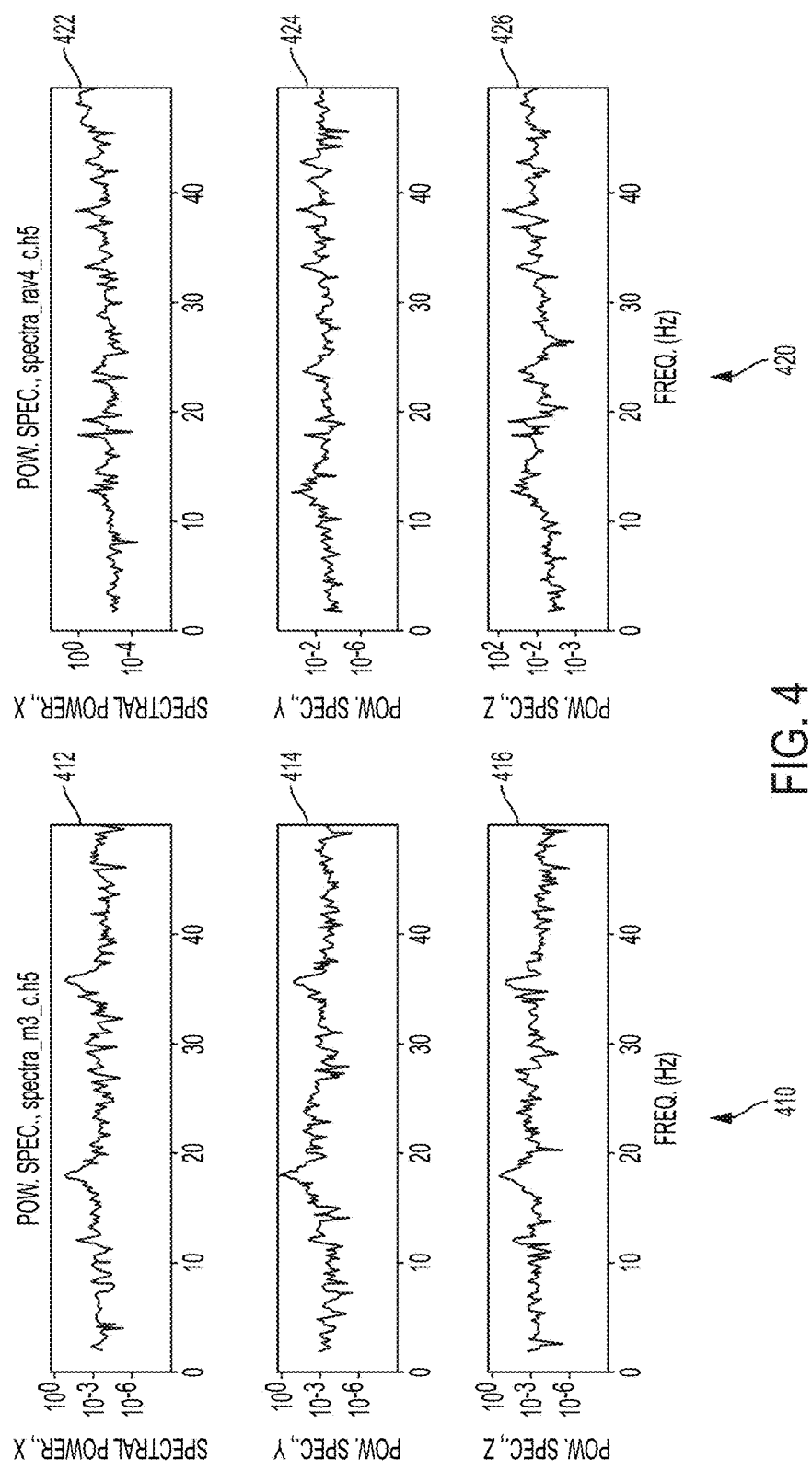
FIG. 4 depicts power spectra representing acceleration data captured by a personal electronic device traveling in two different vehicles, in accordance with some embodiments of the invention.

At the completion of act 320, representative process 300 proceeds to act 330, wherein the acceleration data in the time domain is used to compute power spectra in the frequency domain for each acceleration component. This may be performed using any suitable technique(s). For example, in some embodiments, a Fourier transform may be used to compute power spectra over a frequency range for each acceleration component in the time domain. FIG. 4 depicts representative power spectra computed for acceleration components in the x, y and z directions for two different vehicles, labeled 410 and 420. Specifically, a spectral plot showing vibration patterns for one vehicle in the x-direction across a range of frequencies from 2 Hz to 50 Hz is shown at 412, a spectral plot showing vibration patterns for the same vehicle in the y-direction across the same frequency range is shown at 414, and a spectral plot showing vibration patterns for the same vehicle in the z-direction is shown at 416. Corresponding spectral plots showing vibration patterns in the x-, y-, and z-directions for another vehicle across the same range of frequencies are shown at 422, 424 and 426. Of course, the spectral plots in FIG. 4 are merely representative, and other representations in the frequency domain may vary from those shown in FIG. 4 in any of numerous ways. Any suitable manner of measuring and/or representing spectral power in the frequency domain may alternatively, or additionally, be used, as the invention is not limited in this respect.

It should be appreciated that the invention is not limited to performing a transformation of acceleration data in the time domain to compute power spectra in the frequency domain prior to providing input to the model(s) used in identifying a vehicle. For example, in some embodiments, the model(s) may take the acceleration data extracted in the act 320 directly as input, so that no transformation is performed prior to the model(s) receiving the data. In other embodiments, the model(s) may be used to transform acceleration data. For example, in some embodiments, one or more models may discern the optimal manner of transforming acceleration data (e.g., in a manner which may not involve a Fourier transformation) from the data itself. Any suitable mode(s) of implementation, which may or may not involve transforming acceleration data prior to providing it to the model(s) used in identifying a vehicle, may be used.

The Assignee has recognized that, in certain implementations, acceleration in the x-, y- and/or z-directions may not be isotropic, so that the spectral plots shown in FIG. 4 may represent vibrations which are different than if the personal electronic device had been oriented differently at the time acceleration data was captured. As such, in some embodiments, synthetic re-orientation of the personal electronic device may be applied (e.g., via calculation). A determination whether synthetic re-orientation of the device is to be performed may be made before or after power spectra are calculated in the act 330 (i.e., if such calculation is performed). For example, a visual inspection of the spectrograms shown in FIG. 4 may reveal that vibration in one or more directions is not isotropic, and so synthetic re-orientation of the device may be performed so that the spectrograms may be re-generated to account for the synthetically reoriented data. If synthetic re-orientation is performed, it may be done in any suitable fashion, as the invention is not limited in this respect.

Referring again to FIG. 4, it can be seen from the representative spectral plots at 410 and 420 that the two vehicles represented exhibit specific vibrational patterns in certain frequency ranges. For example, it can be seen that the vehicle represented at 410 exhibits significant acceleration in the x-, y- and z-directions at about 17-19 Hz and 35-37 Hz. It can also be seen that the vehicle represented at 420 exhibits significant acceleration in the x-, y- and z-directions at about at about 18-20 Hz, 37-39 Hz, and 22-24 Hz. That is, each vehicle exhibits a vibrational "signature" in all three directions that may be used to distinguish the vehicle from another. Of course, the vibrational "signature" which makes one vehicle distinguishable from another need not involve acceleration in all three directions, as any suitable acceleration pattern may be used to distinguish one vehicle from another. Indeed, a vibrational signature useful for distinguishing one vehicle from another may comprise a complex pattern of excitation within numerous frequency ranges.

Referring again to FIG. 3, at the completion of act 330, representative process 300 proceeds to act 340, wherein the power spectra data computed in the act 330 is prepared for input to one or more mathematical models by being "flattened" into a one-dimensional array. For example, data representing power spectra for x-, y- and z-direction acceleration components may be organized into an array wherein each element includes spectral power data for only one of the x-, y- or z-directions.

Representative process 300 then proceeds to act 350, wherein some portion of the data produced in the act 340 is provided to one or more mathematical models for training of the model(s). The portion that is provided to the model(s) for training may be any suitable portion, and may, for example, depend on the extent to which the model(s) have been trained. For example, if model training is at the beginning stages wherein overall model performance is being evaluated and parameters are being tuned, then something less than the entirety of the data produced in the act 340 may be provided. By contrast, if model training is nearly complete, then the entirety of the data produced in the act 340, or an approximation thereof, may be provided to the model(s).

Any suitable type(s) of mathematical model may be trained to distinguish one vehicle from another using the data provided in the act 350. For example, a machine learning algorithm (e.g., a neural network) may be trained to use this data to learn how to distinguish one vehicle from another based on the vehicles' vibration patterns. For example, a machine learning algorithm may learn how to identify the repeated structural features within power spectra data which uniquely identify a particular vehicle (and/or expressed within acceleration and/or other data, if transformation into power spectra data is not performed). Of course, a machine learning algorithm need not be used, as any suitable mathematical model(s) and/or computational approach(es) may be employed.

In some embodiments, a model may be trained to discern differences in spectral signatures from a variety of different vehicles, and to identify the particular features exhibited within that data that are discriminative, so that the model may become more efficient over time (e.g., as it is provided with more and more data collected from devices traveling in more and more vehicles) at identifying vehicles. Further, once a model identifies the features which are discriminative, these features may be identified to one or more other models, which may not have been trained on the same data. The features may constitute a "fingerprint" which the receiving model(s) may use in discriminating amongst different vehicles. For example, a fingerprint identified by one model may be used by one or more other models to specifically identify a particular vehicle, or to determine that a newly received vibrational signature is from a different vehicle than the one to which the fingerprint relates.

At the completion of act 350, representative process 300 then proceeds to act 360, wherein another subset of the data generated in the act 340 is provided to the model(s) to which the other subset was provided in the act 350, for test identification of one or more vehicles. For example, the remainder of the data generated in the act 340 may be provided to the model(s) in this step. Alternatively, some other subset may be provided, as determined in any suitable manner.

Test vehicle identification in the act 360 may, in some embodiments, be performed to determine how effective the model(s) trained in the act 350 are at distinguishing between the vehicles represented in the data provided in the act 310, such as to determine whether the model(s) need further training or refinement. The effectiveness of the model(s) in identifying a vehicle may be determined in any suitable fashion. For example, if the model(s) successfully identify less than a threshold percentage of vehicles using the data provided in the act 360, then it may be determined that the model(s) should be further trained before being used further. As such, the act 370, in which the model(s) are revised, is shown in dotted lines in FIG. 3. If the model(s) are revised in act 370, any suitable revision, adjustment and/or refinement may be applied. As one example, more training data may be passed to the model(s) to train the model(s) to identify spectral features that constitute a vehicle's vibration "signature," to learn which spectral features are most useful in discriminating one vehicle from another, etc. Any revision, adjustment and/or refinement may be applied in any suitable fashion, whether using manual techniques, automatic techniques, or a combination thereof. Representative process 300 then completes.

Figure 5:
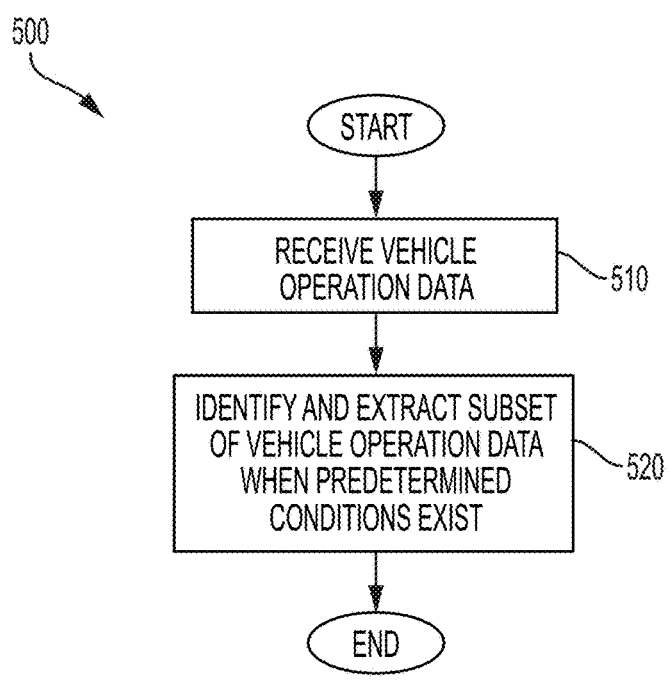
FIG. 5 is a flow chart depicting a representative process for processing trip data captured by a personal electronic device, in accordance with some embodiments of the invention.

Referring again to FIG. 2, at the completion of the act 210, representative process proceeds to the act 220, wherein vehicle operation data that is useful for vehicle identification is received. A representative process 500 for capturing the vehicle operation data useful for identifying a vehicle is shown in greater detail in FIG. 5.

At the start of representative process 500, a body of vehicle operation data is received in act 510. This may be performed in any of numerous ways. For example, a personal electronic device may provide acceleration measurements captured in a vehicle during operation.

Representative process 500 then proceeds to act 520, wherein one or more subsets of the vehicle operation data are identified as having been captured during periods when predetermined conditions exist, and extracted. As described above, some embodiments of the invention may involve identifying a vehicle using data captured while the vehicle is idling, and so in some embodiments act 520 may involve identifying the subsets of vehicle operation data which are captured when the vehicle is idling, and extracting these subsets.

Identifying the subsets of vehicle operation data which are captured when a vehicle is idling may be performed in any suitable fashion. In this respect, FIGS. 6A and 6B each depict acceleration data (i.e., acceleration components in the x-, y- and z-directions) captured by an accelerometer of a personal electronic device over a particular time interval in portion 610, and vehicle speed data inferred from vehicle location information captured by a GPS unit of the personal electronic device over the same time interval in portion 620. It can be seen in portions 620A and 620B that during certain time intervals, the corresponding vehicle is not moving (i.e., its speed is 0 m/s). Specifically, in FIG. 6A, time intervals when the corresponding vehicle is not moving are labeled 601, 602, 603, 604, 605, 606 and 607. Acceleration data during these same time intervals are labeled 611, 612, 613, 614, 615, 616 and 617. Similarly, in FIG. 6B, the time intervals when the corresponding vehicle is not moving are labeled 621, 622, 623, 624, 625, 626, 627, 628, 629, 630 and 631. The acceleration data during these same time intervals are labeled 641, 642, 643, 644, 645, 646, 647, 648, 649, 650 and 651. Thus, for the representative vehicle operation data represented in FIGS. 6A-6B, act 520 may involve extracting acceleration data for the time intervals labeled 611, 612, 613, 614, 615, 616, and 617, or 641, 642, 643, 644, 645, 646, 647, 648, 649, 650 and 651. At the completion of act 520, representative process 500 completes.

Referring again to FIG. 2, at the completion of the act 220, representative process 200 proceeds to act 230, wherein the model(s) trained in the act 210 are applied to the vehicle operation data received in the act 220 in identifying a vehicle. For example, in some embodiments, the vehicle operation data received in the act 220 may be processed in a manner similar to that which is described above with reference to FIG. 3, such that the acceleration information in the time domain comprising the vehicle operation data received in the act 220 is used to compute power spectra in the x-, y- and z-directions in the frequency domain, and the model(s) trained in the act 210 are applied to the power spectra data for use in identifying the vehicle in which the personal electronic device was traveling when the acceleration data was captured. Of course, some embodiments of the invention may not involve using the model(s) trained in the act 210 in identifying a vehicle, as any of numerous other techniques may be used.

It should be appreciated that embodiments of the invention are not limited to using only the model(s) trained in the act 210 in identifying a vehicle. For example, as described above, discriminative information identified by one model may be supplied to one or more other models for subsequent use in identifying a vehicle. Moreover, the information that is used in identifying a vehicle is not limited to that which is produced by a model. Any other suitable form(s) of information may also be used in identifying a vehicle in act 230. The invention is not limited in this respect.

Figure 7:
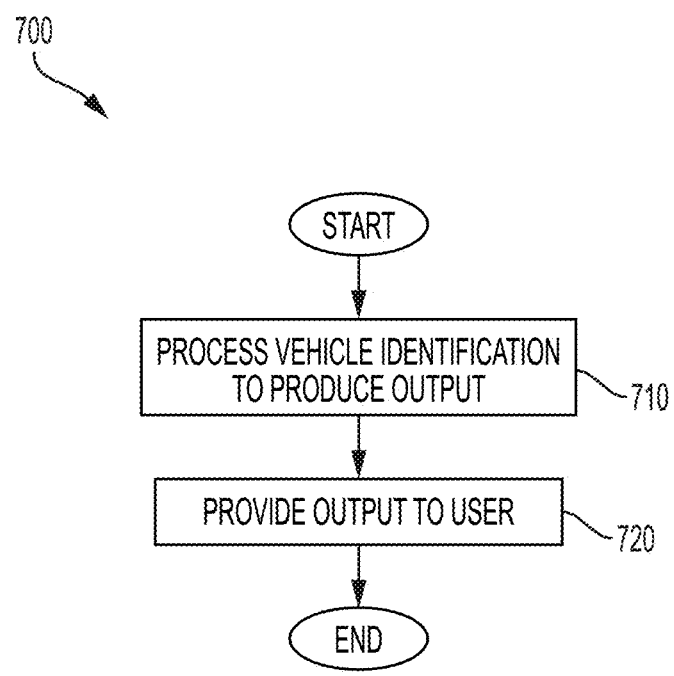
FIG. 7 is a flow chart depicting a representative process for generating output for display based upon a vehicle being identified, in accordance with some embodiments of the invention.

At the completion of the act 230, representative process 200 may proceed to the act 240, as indicated by the dotted lines in FIG. 2. In act 240, the vehicle identification performed in act 230 is used to provide information to a user. A representative process 700 for using a vehicle identification to provide information to a user is shown in greater detail in FIG. 7.

At the start of representative process 700, a vehicle identification (e.g., generated in the act 230 shown in FIG. 2) is processed to produce output in act 710. This output may take any of numerous forms, depending on how it is to be used. In one example, a vehicle identification may be processed to produce output that is designed for display to the user of the personal electronic device in real time. For example, some embodiments of the invention may provide for displaying vehicle-specific information such as warnings, maintenance reminders, readouts, and/or other information to a user while he/she travels in a vehicle. In these embodiments, act 710 may involve producing a representation of the information to be displayed to the user, and act 720 may involve rendering the display.

In another example, a vehicle identification may be used to manage power consumption by a personal electronic device. For example, if it is determined that the user is currently traveling in a vehicle for which acceleration data need not be captured (e.g., because the vehicle is not of interest in the analysis described above), then the data capture functionality may be turned off so as to conserve power consumption by the personal electronic device. In these embodiments, act 710 may involve producing output for use by software which controls acceleration data capture, and act 720 may providing the output to the software.

At the completion of the act 720, representative process 700 completes.

Referring again to FIG. 2, at the completion of optional act 240, representative process 200 proceeds to act 250, wherein other vehicle operation data is received. Like act 240, act 250 is also optional, as indicated by the dotted lines in FIG. 2.

The other vehicle operation data which is received in the act 250 may take any of numerous forms. As one example, this data may relate to an individual's behavior in operating the vehicle, such as which may be captured by the accelerometer, gyroscope and/or GPS unit of the personal electronic device. Of course, the data captured in the act 250 need not be captured by components of the personal electronic device, and may be captured by any suitable component(s), whether internal or external to the vehicle. In this respect, the vehicle identification performed in the act 230 may indicate a time period during which the identified vehicle was being operated, and information gathered by the other component(s) may be correlated to the vehicle based on the time at which the information was gathered describe may be used to produce information for other users.

One representative use for the vehicle operation data received in the act 250 is by an insurer which underwrites a UBI policy on the vehicle. However, any of numerous other uses are possible. As one example, the manager of a team of salespeople each assigned to one of a fleet of vehicles may find data relating to each salesperson's operation of his/her assigned vehicle useful for training purposes. As another example, behavioral data relating to one or more operators, organizations, circumstances, time periods, etc., may be aggregated for analysis.

At the completion of optional act 250, representative process 200 proceeds to act 260, wherein the model(s) applied in the act 230 are revised. Like acts 240 and 250, act 260 is optional, as indicated by the dotted lines in FIG. 2.

The model(s) may be revised in any of numerous ways. In some embodiments, the vehicle operation data which is identified and extracted in act 520 (FIG. 5) may be used to further train the model(s), such as to identify particular spectral features which are useful for discriminating between one vehicle and another. As a result of such revision, the model(s) may become more effective at identifying vehicles over time. At the completion of the act 250, representative process 200 completes.

It should be appreciated that although the embodiments described above relate to identifying a vehicle using acceleration data which is captured by a personal electronic device (or derivations or representations thereof), the invention is not limited to employing information which relates to acceleration, or to using information which is captured by a personal electronic device, to identify a vehicle. Any suitable information, captured by any suitable device(s), may be used to identify a vehicle.

It should also be appreciated that, in some embodiments, the methods described above with reference to FIGS. 2, 3, 5 and 7 may vary, in any of numerous ways. For example, in some embodiments, the steps of the methods described above may be performed in a different sequence than that which is described, a method may involve additional steps not described above, and/or a method may not involve all of the steps described above.

Figure 8:
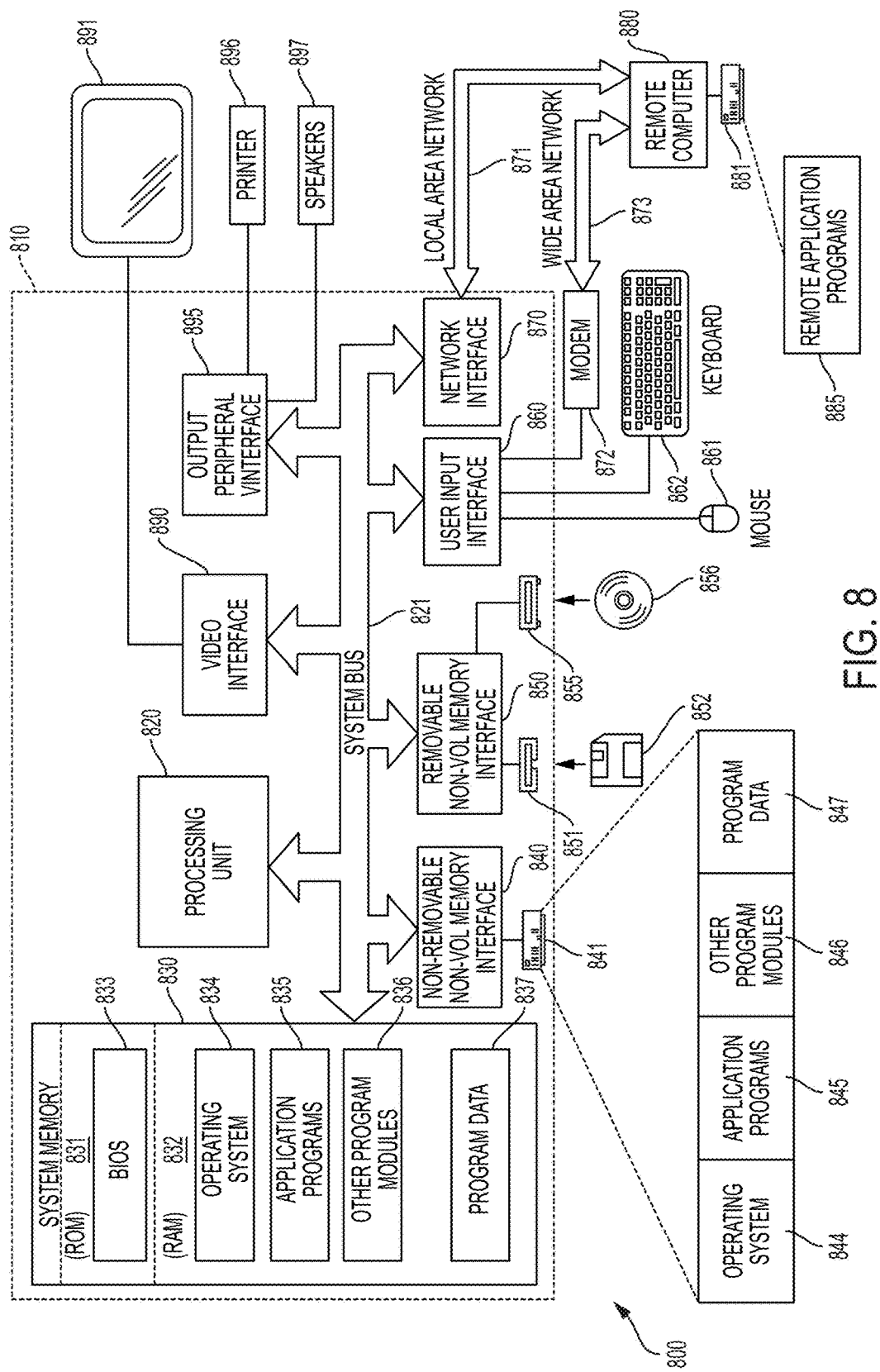
FIG. 8 is a block diagram depicting a representative computing system which may be used to implement certain aspects of the invention.

It should further be appreciated from the foregoing description that some aspects of the invention may be implemented using a computing device. FIG. 8 depicts a general purpose computing device, in the form of a computer 810, which may be used to implement certain aspects of the invention. For example, computer 810, or components thereof, may constitute the personal electronic device 110 or server 130, or components thereof.

In computer 810, components include, but are not limited to, a processing unit 820, a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other one or more media which may be used to store the desired information and may be accessed by computer 810. Communication media typically embody computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared and other wireless media. Combinations of the any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 12 illustrates operating system 834, application programs 835, other program modules 839 and program data 837.

The computer 810 may also include other removable/non-removable, volatile/nonvolatile computer storage media. By way of example only, FIG. 12 illustrates a hard disk drive 841 that reads from or writes to non-removable, nonvolatile magnetic media, a magnetic disk drive 851 that reads from or writes to a removable, nonvolatile magnetic disk 852, and an optical disk drive 855 that reads from or writes to a removable, nonvolatile optical disk 859 such as a CD ROM or other optical media. Other removable/non-removable, volatile/nonvolatile computer storage media that can be used in the exemplary computing system include, but are not limited to, magnetic tape cassettes, flash memory cards, digital versatile disks, digital video tape, solid state RAM, solid state ROM, and the like. The hard disk drive 841 is typically connected to the system bus 821 through an non-removable memory interface such as interface 840, and magnetic disk drive 851 and optical disk drive 855 are typically connected to the system bus 821 by a removable memory interface, such as interface 850.

The drives and their associated computer storage media discussed above and illustrated in FIG. 12, provide storage of computer readable instructions, data structures, program modules and other data for the computer 810. In FIG. 12, for example, hard disk drive 841 is illustrated as storing operating system 844, application programs 845, other program modules 849, and program data 847. Note that these components can either be the same as or different from operating system 834, application programs 835, other program modules 539, and program data 837. Operating system 844, application programs 845, other program modules 849, and program data 847 are given different numbers here to illustrate that, at a minimum, they are different copies. A user may enter commands and information into the computer 810 through input devices such as a keyboard 892 and pointing device 891, commonly referred to as a mouse, trackball or touch pad. Other input devices (not shown) may include a microphone, joystick, game pad, satellite dish, scanner, or the like. These and other input devices are often connected to the processing unit 820 through a user input interface 590 that is coupled to the system bus, but may be connected by other interface and bus structures, such as a parallel port, game port or a universal serial bus (USB). A monitor 891 or other type of display device is also connected to the system bus 821 via an interface, such as a video interface 890. In addition to the monitor, computers may also include other peripheral output devices such as speakers 897 and printer 899, which may be connected through a output peripheral interface 895.

The computer 810 may operate in a networked environment using logical connections to one or more remote computers, such as a remote computer 880. The remote computer 880 may be a personal computer, a server, a router, a network PC, a peer device or other common network node, and typically includes many or all of the elements described above relative to the computer 810, although only a memory storage device 881 has been illustrated in FIG. 12. The logical connections depicted in FIG. 12 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 890, or other appropriate mechanism. In a networked environment, program modules depicted relative to the computer 810, or portions thereof, may be stored in the remote memory storage device. By way of example, and not limitation, FIG. 12 illustrates remote application programs 885 as residing on memory device 881. It will be appreciated that the network connections shown are exemplary and other means of establishing a communications link between the computers may be used.

Embodiments of the invention may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the invention discussed above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the present invention as discussed above. As used herein, the term "computer-readable storage medium" encompasses only a tangible machine, mechanism or device from which a computer may read information. Alternatively or additionally, the invention may be embodied as a computer readable medium other than a computer-readable storage medium. Examples of computer readable media which are not computer readable storage media include transitory media, like propagating signals.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Further, though advantages of the present invention are indicated, it should be appreciated that not every embodiment of the invention will include every described advantage. Some embodiments may not implement any features described as advantageous herein. Accordingly, the foregoing description and drawings are by way of example only.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

The invention may be embodied as a method, of which various examples have been described. The acts performed as part of the methods may be ordered in any suitable way. Accordingly, embodiments may be constructed in which acts are performed in an order different than illustrated, which may include different (e.g., more or less) acts than those which are described, and/or which may involve performing some acts simultaneously, even though the acts are shown as being performed sequentially in the embodiments specifically described above.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:
1. A method, comprising acts of:
(A) receiving data captured by a personal electronic device residing within a vehicle having a motor, the data captured by the personal electronic device relating to a physical phenomenon occurring as a result of operation of the vehicle motor, the personal electronic device being associated with a user;
(B) determining whether the vehicle was idling when the data was captured; and
(C) if it is determined in the act (B) that the vehicle was idling when the data was captured, determining, using the data received in the act (A), whether the vehicle is insured by at least one of the user, a person with whom the user is associated, and an organization with which the user is associated.

2. The method of claim 1, wherein the vehicle is an automobile.

3. The method of claim 2, wherein the act (C) comprises identifying a make and model of the automobile.

4. The method of claim 1, wherein the data received in the act (A) indicates acceleration of the personal electronic device over time.

5. The method of claim 4, wherein the data received in the act (A) indicates acceleration of the personal electronic device in x-, y- and z-directions over time.

6. The method of claim 1, wherein the data received in the act (A) indicates a location of the personal electronic device over time.

7. The method of claim 1, wherein the data received in the act (A) indicates an orientation of the personal electronic device at one or more points in time.

8. The method of claim 1, wherein the method comprises, prior to the act (A), an act of training at least one model to identify the vehicle using other data captured by at least one personal electronic device residing within at least one vehicle during operation of the at least one vehicle, and the act (C) comprises applying the at least one model to the data received in the act (A) in making the determination in the act (C).

9. The method of claim 8, wherein:
the other data indicates acceleration of the personal electronic device in the time domain; and
the act performed prior to the act (A) comprises computing, from the data indicating acceleration of the personal electronic device in the time domain, one or more power spectra in the frequency domain, and training the at least one model using the one or more power spectra in the frequency domain.

10. The method of claim 1, wherein the method comprises employing a result of the determination in the act (C) to provide vehicle-specific information to the user or an individual other than the user.

11. The method of claim 1, wherein the method comprises receiving other information captured by the personal electronic device relating to the operation of the vehicle.

12. The method of claim 11, wherein the other information relates to behavior of the user associated with the personal electronic device during operation of the vehicle.

13. The method of claim 1, wherein the acts (A), (B) and (C) are performed by the personal electronic device.

14. The method of claim 1, wherein the acts (A), (B) and (C) are performed by a server in networked communication with the personal electronic device.

15. The method of claim 1, wherein the personal electronic device is a smartphone.

16. At least one computer-readable storage medium having instructions recorded thereon which, when executed by a computer, cause the computer to perform a method comprising acts of:
(A) receiving data captured by a personal electronic device residing within a vehicle having a motor, the data captured by the personal electronic device relating to a physical phenomenon occurring as a result of operation of the vehicle motor, the personal electronic device being associated with a user;
(B) determining whether the vehicle was idling when the data was captured; and
(C) if it is determined in the act (B) that the vehicle was idling when the data was captured, determining, using the data received in the act (A), whether the vehicle is insured by at least one of the user, a person with whom the user is associated, and an organization with which the user is associated.

17. A computing system, comprising:
at least one computer-readable storage device, storing instructions; and
at least one computer processor, programmed via the instructions to:
receive data captured by a personal electronic device residing within a vehicle having a motor, the data captured by the personal electronic device relating to a physical phenomenon occurring as a result of operation of the vehicle motor, the personal electronic device being associated with a user;
determine whether the vehicle was idling when the data was captured; and
if it is determined that the vehicle was idling when the data was captured, determine, using the data, whether the vehicle is insured by at least one of the user, a person with whom the user is associated, and an organization with which the user is associated.

18. The computing system of claim 17, wherein the vehicle is an automobile.

19. The computing system of claim 18, wherein the at least one computer processor is programmed via the instructions to identify a make and model of the automobile.

20. The computing system of claim 17, wherein the data received by the at least one computer processor indicates acceleration of the personal electronic device over time.

21. The computing system of claim 20, wherein the data received by the at least one computer processor indicates acceleration of the personal electronic device in x-, y- and z-directions over time.

22. The computing system of claim 17, wherein the data received by the at least one computer processor indicates a location of the personal electronic device over time.

23. The computing system of claim 17, wherein the data received by the at least one computer processor indicates an orientation of the personal electronic device at one or more points in time.

24. The computing system of claim 17, wherein the at least one computer processor is programmed via the instructions to, prior to receiving the data, train at least one model to identify the vehicle using other data captured by at least one personal electronic device residing within at least one vehicle during operation of the at least one vehicle, and to apply the at least one model to the received data in making the determination whether the vehicle is insured by at least one of the user, a person with whom the user is associated, and an organization with which the user is associated.

25. The computing system of claim 24, wherein:
the other data indicates acceleration of the personal electronic device in the time domain; and
the at least one computer processor is programmed via the instructions to compute, from the data indicating acceleration of the personal electronic device in the time domain, one or more power spectra in the frequency domain, and training the at least one model using the one or more power spectra in the frequency domain.

26. The computing system of claim 17, wherein the at least one computer processor is programmed via the instructions to employ a result of the determination whether the vehicle is insured by at least one of the user, a person with whom the user is associated, and an organization with which the user is associated in providing vehicle-specific information to a user.

27. The computing system of claim 17, wherein the at least one computer processor is programmed via the instructions to receive other information captured by the personal electronic device relating to the operation of the vehicle.

28. The computing system of claim 27, wherein the other information relates to behavior of the user associated with the personal electronic device during operation of the vehicle.

29. The computing system of claim 17, wherein the personal electronic device is a smartphone.

* * * * *